United States Patent [19]
Cornelissen et al.

[11] 3,865,074
[45] Feb. 11, 1975

[54] DEVICE FOR COATING A WIRE OF AN ELECTRICALLY CONDUCTING MATERIAL CONTINUOUSLY FROM THE GAS PHASE

[75] Inventors: Gerardus Antonius Petrus Maria Cornelissen; Johannes Cornelis Norbertus Rijpers; Gerardus Henricus Maria Siebers, all of Emmasingel, Eindhoven, Netherlands

[73] Assignee: U. S. Philips Corporation, New York, N.Y.

[22] Filed: Apr. 24, 1974

[21] Appl. No.: 463,737

[30] Foreign Application Priority Data
May 5, 1973 Netherlands.................... 7306306

[52] U.S. Cl. .............................................. 118/49.5
[51] Int. Cl.............................................. C23c 13/10
[58] Field of Search ........ 118/49.1, 49.5, 50.1, 620; 117/93.2, 107.1, 93; 266/3 R; 34/15, 242; 339/278 C; 219/155

[56] References Cited
UNITED STATES PATENTS
| | | | |
|---|---|---|---|
| 2,877,138 | 3/1959 | Vodonia .............................. | 117/93 |
| 3,182,277 | 5/1965 | Ashby ......................... | 339/118 R X |
| 3,514,575 | 5/1970 | Hall et al. ...................... | 118/49.5 X |

*Primary Examiner*—Morris Kaplan
*Attorney, Agent, or Firm*—Frank R. Trifari; Carl P. Steinhauser

[57] ABSTRACT

A device for coating a wire continuously from the gas phase, comprising a tubular reaction chamber provided with at least one inlet and outlet for the gas or gas mixture providing the coating and with seals at both ends through which the wire is passed, which seals comprise a wire filling of metal wire serving as an electrical contact with the wire to be coated, and a chamber arranged in series with the reaction chamber in which a gas such as a rare gas, nitrogen or hydrogen is passed, which chamber has two apertures of small diameter through which the wire to be coated can be passed with some clearance.

3 Claims, 1 Drawing Figure

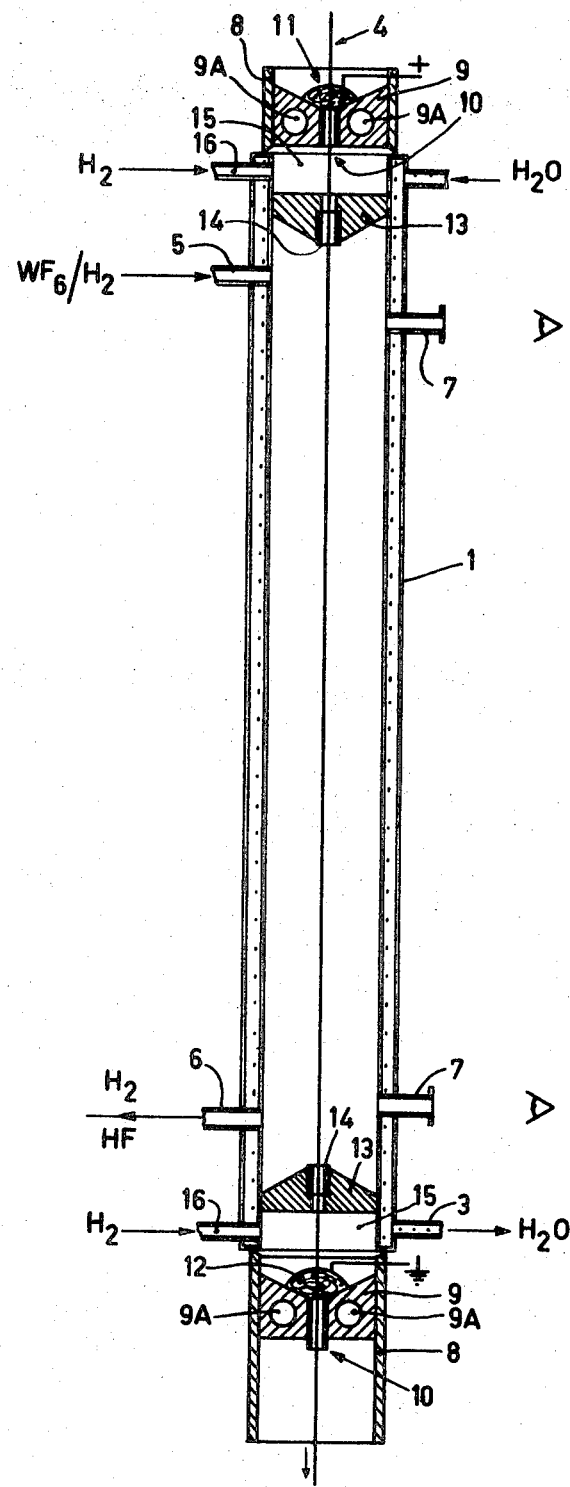

DEVICE FOR COATING A WIRE OF AN ELECTRICALLY CONDUCTING MATERIAL CONTINUOUSLY FROM THE GAS PHASE

The invention relates to a device for coating a wire of an electrically conducting material continuously from the gas phase by contacting a gas providing the coating with an electrically heated wire part, which device comprises a tubular reaction chamber provided with at least one inlet and outlet for the gas or gas mixture providing the coating and seals at both ends through which the wire is passed, and contacts which serve to apply an electrical potential difference across the ends of the wire part which is present in the reaction chamber. Devices of this kind are known from United Kingdom Patent Specification 1,051,883 and United Kingdom Patent Specification 1,177,854.

In these two patent specifications devices are described which can be used for coating a tungsten wire or a wire of another conducting material with boron. United Kingdom Patent Specification 1,051,883 describes a device having a horizontally arranged tubular reaction chamber and United Kingdom Patent Specification 1,177,854 described a device having a vertically arranged tubular reaction chamber. Both devices are provided with mercury containing seals with the wire being passed through the mercury which serves not only to shut off the reaction chamber from the atmosphere but also as an electrical contact for passing an electrical current through the wire part present in the reaction chamber.

The use of these devices is of course not limited to the continuous coating of wires of electrically conducting material with boron by means of pyrolysis or reduction with hydrogen of a gaseous boron compound. Devices of this kind may alternatively be used to deposit other high melting point materials continuously from the gas phase on a wire such as tungsten, zirconium, molybdenum silicon carbide. Particularly the halides such as the chlorides and fluorides of these metals and optionally of silicon are used for this purpose. The wires to be coated may consist of tungsten, molybdenum or another high melting point metal, copper aluminum, carbon, or glass or quartz wires which are coated with a conducting metal or carbon coating and the like.

Devices having mercury comprising seals have some drawbacks.

The halogens or hydrogen halide compounds formed during pyrolysis or reduction of metal halides may react with mercury while forming solid mercury halides.

Another drawback is that mercury is taken along by the wire in case of feed-through rates exceeding a given critical rate which is dependent on the wire diamter.

It is an object of the invention to provide a device in which these drawbacks cannot occur.

A device satisfying this object is characterized in that the seals comprise a wire filling of metal wire which serves as an electrical contact with the wire to be coated and a chamber arranged in series with the reaction chamber in which a gas such as a rare gas, nitrogen or hydrogen is passed, which chamber is provided with two apertures of small diameter through which the wire to be coated can be passed with some clearance.

A device according to the invention has the advantage that no materials detrimentally influenceing the coating process such as mercury can be taken along by the wire in the reaction chamber while the seals and the contact material cannot be attacked by aggressive gases released in the reaction chamber.

The method will now be described in greater detail with reference to the accompanying FIGURE showing an embodiment of a device according to the invention.

In the drawing the sole FIGURE diagrammatically shows in a cross-section a vertically arranged tubular reaction chamber.

The reaction chamber mainly consists of a double-walled tube 1 through which a coolant is passed through the inlet and outlet pipes 2 and 3, i.e., water in the embodiment shown. Cooling of the tube 1 may be necesssry when the tube reaches a sufficiently high temperature by thermal radiation of the incandescing wire 4 to cause pyrolysis or reduction of the gas on the wall.

The tubular reaction chamber 1 is provided with inlet and outlet pipes 5 and 6 for a gas mixture. Furthermore a window 7 is shown in the FIGURE.

The seals are constituted by a tube 8 for example of high melting point glass which may be connected to the tubular reaction chamber 1 for example by means of a union (not shown). The tube 8 has a glass part 9 provided with a capillary aperture 10 having a sufficient inner diameter to allow the wire 4 to pass with clearance. A wire filling of fine metal wire 11 and 12 rest on the glass parts 9. Tungsten wire having a diameter of between 10 and 15 micrometers is suitable for this purpose. The wire filling 11 is connected to a terminal of a current source while the wire filling 12 is connected to the other terminal or is connected to ground. The glass part 9 has ducts 9a for passing a coolant around the wire fillings of metal wire 11, 12 and for cooling the glass part 9. The wire fillings of metal wire 11, 12 may be pressed down by means of a pressure block or a resilient body (not shown) to improve the electrical contact between the wire 4 and the wire fillings of metal wire 11, 12. In the embodiment according to the invention parts 13 of a material resistant to the reaction products formed during pyrolysis or reduction of the gas in the reactor space are present in the tubular reactor 1. A suitable material resistant to halogens and hydrogen halide compounds is for example polytetrafluoroethylene. Capillary apertures 14, for example formed by a tube of heat-resistant glass are present in the parts 13. The parts 9 and 13 jointly bound a chamber 15. The chamber is provided with a gas inlet through which a rare gas, nitrogen, hydrogen or another suitable gas can be passed into the chamber 15. The cross-sections of the apertures 10 and 14 are preferably chosen to be such that the gas passed into the chamber 15 mainly leaves this chamber through the aperture 14 so that reactive gases formed during pyrolysis or reduction of the gas in the reaction chamber are prevented from penetrating the chambers 15. Consequently there is no risk of reactive gases coming in the space surrounding the reactor or chemically attacking the parts 9 and the wire filling of metal wire 11 and 12.

EXAMPLE

A tungsten wire 4 is coated with tungsten with the aid of a device according to the invention provided with a vertically arranged reaction chamber 1 of such a dimension that the wire 4 to be coated is exposed in lengths of 40 cm to the gas mixture in the reaction chamber 1. The tube consists of copper and has an internal diameter of 1 cm. The tube is double-walled and as a coolant water of 10°C is used. Hydrogen is passed through the inlet pipes 16 into the chamber 15 and a mixture of tungsten hexafluoride and hydrogen in a ratio of 1 : 15 is passed into the reaction chamber through the inlet pipe 5. Such a mixture reacts in accordance with $$WF_6 + 3H_2 \longrightarrow W \downarrow + 6HF$$

on the hot wire 4. The HF formed during the reaction and the superfluous hydrogen leaves the reaction chamber 1 through outlet pipe 6.

The diameters and the lengths of the capillaries 10 and 14 are chosen to be such that the hydrogen passing through inlet pipes 16 into the chambers leave these chambers for approximately 90% through the capillaries Some results are stated in the table below:

| Supply rate of | I | II |
| --- | --- | --- |
| Metal halide (WF$_6$) | 25 ml/min | 50 ml/min |
| H$_2$ | 210 ml/min | 210 ml/min |
| Wire feed rate | 110 m/min | 10 m/min |
| W-substrate diameter | 12.5 $\mu$m | 119 $\mu$m |
| Wire temperature | 800°C | 700°C |
| Final diameter | 16.5 $\mu$m | 130 $\mu$m |

During the experiment both the part 9 consisting of glass and the wire fillings 11 and 12 of tungsten wire and the parts 13 consisting of polytetrafluoroethylene with the capillary tube 14 of glass remained unattacked. The wire fillings consisted in the first case of tunsten wire having a diameter of 12.5 micrometers and in the second case they had a diameter of 30 micrometers.

It is evident that a heating device may be present between or may replace the double walls of the reaction chamber 1 if it is necessary to heat the walls of the reaction chamber, for example, to maintain reaction products of the reacting gases in a vapour form in the reaction chamber.

An advantage of the device is that the reaction chamber may be arranged both horizontally and vertically, which requires special provisions when using mercury contacts.

What is claimed is:

1. A device for coating a wire of an electrically conducting material continuously from a gas phase by contacting a gas providing the coating with an electrically heated wire part, which device comprises a tubular reaction chamber provided with at least one inlet and outlet for the gas providing the coating and with seals at both ends through which the wire is passed, the seals each comprising a wire filling of metal wire serving as an electrical contact with the wire to be coated, and transverse partitions at each end of said reaction chamber spaced from said seals defining chambers arranged in series with the reaction chamber, inlet means to introduce an inert gas into said latter chambers, said partitions each being provided with two apertures through which the wire to be coated is passed.

2. A device as claimed in claim 1, wherein the ratio of the diameters of the apertures through which the wire is passed is such that the gas introduced into the chambers leaves these chambers mainly through said aperture through which the wire is passed into the reaction chamber or leaves said chamber.

3. A device as claimed in claim 1, wherein the wire filling of metal wire consists of tungsten wire.

* * * * *